(12) United States Patent
Jean

(10) Patent No.: US 9,801,446 B2
(45) Date of Patent: Oct. 31, 2017

(54) SYSTEM FOR PROTECTING VEHICLES FROM DEBRIS

(71) Applicant: Ronald Jean, Pembroke Pines, FL (US)

(72) Inventor: Ronald Jean, Pembroke Pines, FL (US)

(*) Notice: Subject to any disclaimer, the term of this patent is extended or adjusted under 35 U.S.C. 154(b) by 0 days.

(21) Appl. No.: 14/792,328

(22) Filed: Jul. 6, 2015

(65) Prior Publication Data
US 2017/0000230 A1    Jan. 5, 2017

Related U.S. Application Data

(60) Provisional application No. 62/188,024, filed on Jul. 2, 2015.

(51) Int. Cl.
*B60J 11/08* (2006.01)
*A45C 13/00* (2006.01)

(52) U.S. Cl.
CPC ............ *A45C 13/002* (2013.01); *B60J 11/08* (2013.01)

(58) Field of Classification Search
CPC ....................................................... B60J 11/08
USPC ............................ 150/168; 296/95.1, 136.08
See application file for complete search history.

(56) References Cited

U.S. PATENT DOCUMENTS

| | | | | |
|---|---|---|---|---|
| 2,646,118 A * | 7/1953 | Berty | .................. | B60J 11/08 160/369 |
| 2,874,709 A * | 2/1959 | Cohen | ................. | B60J 11/00 135/119 |
| 2,907,384 A * | 10/1959 | Spratt | .................. | B60J 11/08 160/370.21 |
| 3,042,111 A * | 7/1962 | Wytovich | ............. | B60J 11/08 150/168 |
| 3,140,115 A * | 7/1964 | Biiss | ..................... | B60J 11/08 150/168 |
| 3,391,724 A * | 7/1968 | Charlesworth | ......... | B60J 11/08 160/370.21 |
| 4,948,191 A * | 8/1990 | Cao | ....................... | B60J 11/00 160/370.21 |
| 5,035,460 A * | 7/1991 | Huang | ................... | B60J 11/08 160/370.21 |
| 5,441,095 A * | 8/1995 | Trethewey | ............ | B60J 11/08 160/370.21 |
| 5,490,707 A * | 2/1996 | De La Cruz | ........... | B60J 11/00 150/166 |
| 6,241,303 B1 * | 6/2001 | Yee | ........................ | B60J 11/08 150/168 |
| 6,705,337 B1 * | 3/2004 | Peckham | ............... | B60J 11/00 135/88.07 |
| 7,673,924 B1 * | 3/2010 | Lau | ........................ | B60J 11/08 296/95.1 |
| 8,656,968 B2 * | 2/2014 | Lin | ........................ | B60J 11/08 150/168 |
| 9,016,755 B2 * | 4/2015 | Ein | ........................ | B60J 11/08 296/95.1 |

* cited by examiner

*Primary Examiner* — Sue A Weaver
(74) *Attorney, Agent, or Firm* — David W. Barman

(57) ABSTRACT

An assembly for protecting the rain gutter of an automobile having a main assembly body a first securing means, and a second securing means whereby said assembly is constructed and arranged to cover the rain gutter of an automobile.

9 Claims, 9 Drawing Sheets

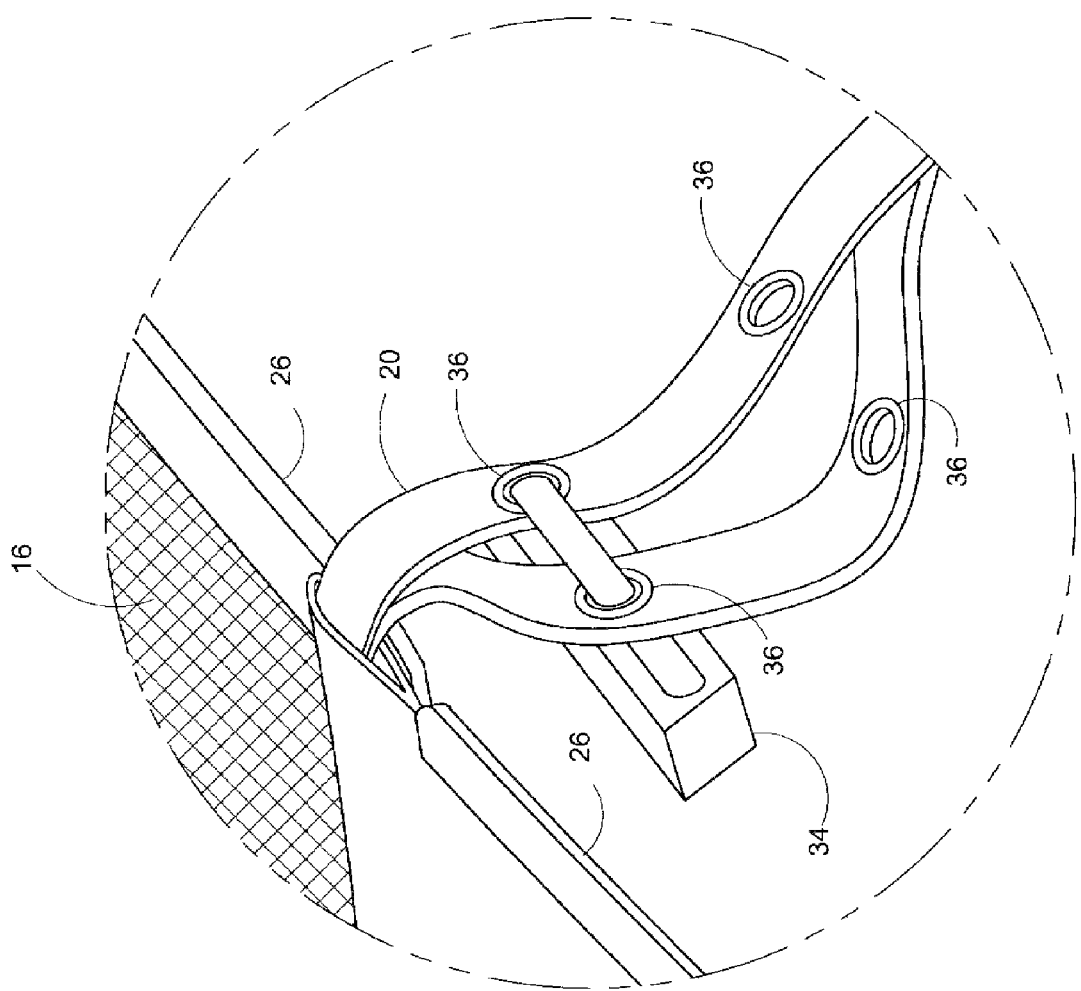

SYSTEM FOR PROTECTING VEHICLES FROM DEBRIS

INDEX TO RELATED APPLICATIONS

This application is a non-provisional of and claims benefit to U.S. Provisional Patent Application Ser. No. 62/188,024 filed Jul. 2, 2015 the disclosure of which is incorporated herein by reference in its entirety.

BACKGROUND OF THE INVENTION

Although there have been many advances in automobile design, virtually all automobiles still maintain a rain gutter region for safely collecting and dispersing water that runs off of the automobile windshield. With all of the advances in design and configuration, the rain gutter region still provides a difficulty in that debris continually accumulates thereon. The present invention provides a simple way to protect the automobile rain gutter.

SUMMARY OF THE INVENTION

The present invention provides several embodiments for an assembly to protect the automobile rain gutter from accumulation of debris. In one embodiment, a rectangular main body is constructed and arranged to cover the interface of the automobile windshield and the automobile hood, thus covering the automobile rain gutter. In one embodiment, the assembly includes a single band incorporated within the assembly along the horizontal edge closest to the driver, and suction cups along the horizontal edge away from the driver. The edges are all contemplated being reinforced for strength and stability. In one embodiment, the securing means of the assembly include adjustable straps.

In one embodiment, the present invention is an assembly for protecting the rain gutter of an automobile, said assembly comprising: a main assembly body, having a first longitudinal edge, nearest to said automobile front end and a second longitudinal edge furthest from said automobile front edge, a first horizontal edge nearest to a driver side of said automobile, and a second horizontal edge, nearest to a passenger side of said automobile; a first securing means attached to said first horizontal edge, and a second securing means attached to said second horizontal edge, whereby said assembly is constructed and arranged to cover the rain gutter of an automobile.

The edges define a shape that is somewhat rectangular although with rounded corner regions.

Although horizontal and vertical edges are used to define the boundary of the main body, these terms are relative as seen in the figures. The edges are not strictly linear as they follow the curvature of the main body.

In one embodiment, the first securing means and second securing means are straps constructed and arranged to attach to existing rear view mirrors of an automobile.

In one embodiment, the main assembly body is an automobile rain gutter cover.

In one embodiment, the main assembly body is an automobile rain gutter cover includes one or more suction cups positioned along said first longitudinal edge. That is to say, the suction cups are on the edge furthest from the driver, which is also the edge closest to the front of the vehicle.

In one embodiment, the main assembly body is an automobile rain gutter cover includes one or more suction cups positioned along said first longitudinal edge and one or more suction cups positioned along said second longitudinal edge. The second edge is the horizontal edge closest to the driver.

In one embodiment, the main assembly body includes an elastic member along said second longitudinal edge.

In one embodiment, the first securing means and second securing means are adjustable straps constructed and arranged to attach to existing rear view mirrors of said automobile.

In one embodiment, the assembly is further comprising a windshield cover having a lower longitudinal edge and an upper longitudinal edge, said windshield cover is attached to said main body, wherein said lower longitudinal edge of said windshield cover is attached to said second longitudinal edge of said main body.

In one embodiment, the windshield cover permanently attached to said main body.

In one embodiment, the windshield cover removably attached to said main body.

In one embodiment, the windshield cover includes one or more suction cups along said upper longitudinal edge.

BRIEF DESCRIPTION OF THE SEVERAL VIEWS OF THE DRAWING

FIG. 9 is a sectional view of one embodiment including a strap handle from FIG. 3.

DETAILED DESCRIPTION OF THE PREFERRED EMBODIMENT

Figure 2:
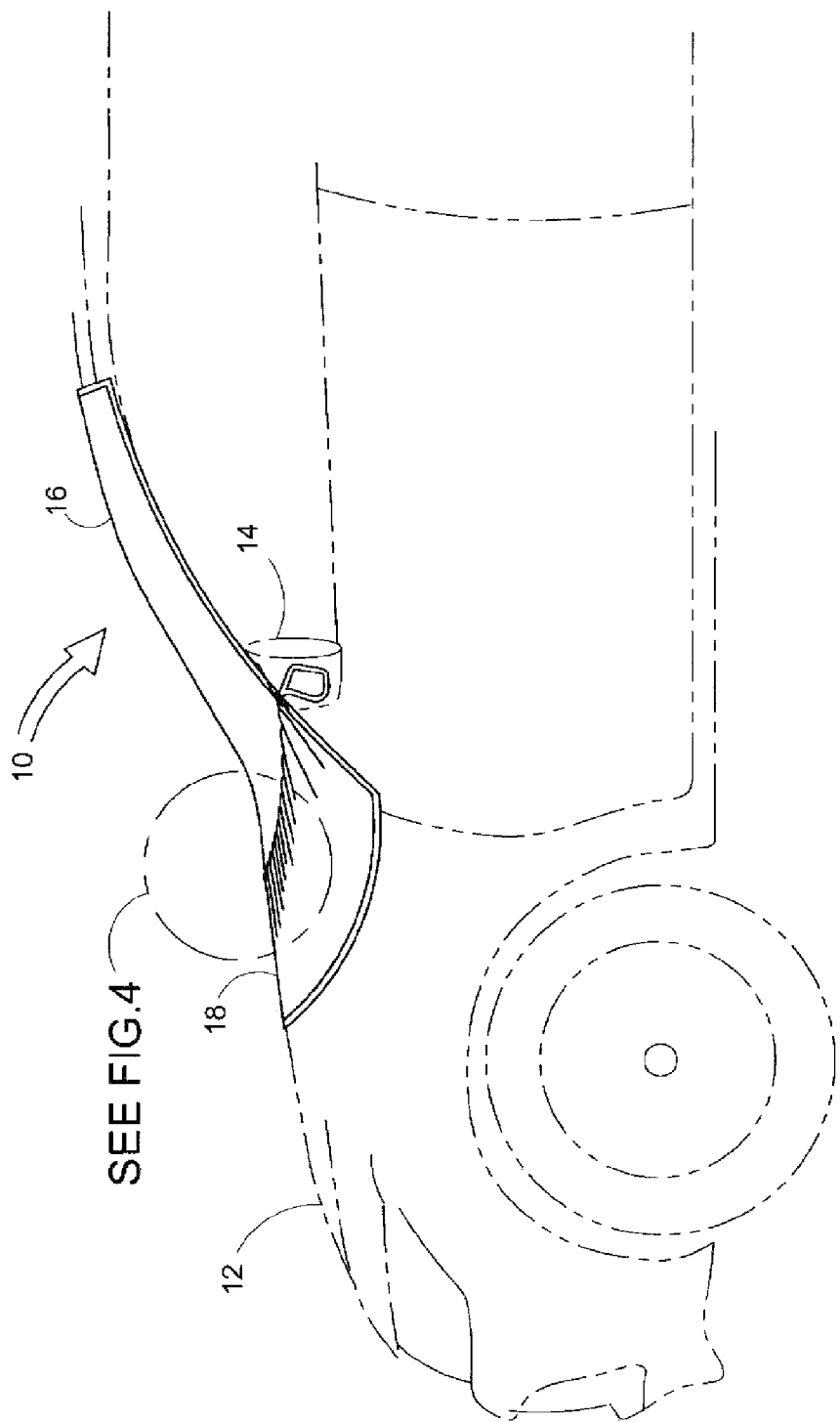
FIG. 2 is a side view of an automobile affixed with the windshield gutter guard according to the present invention.
Figure 3:
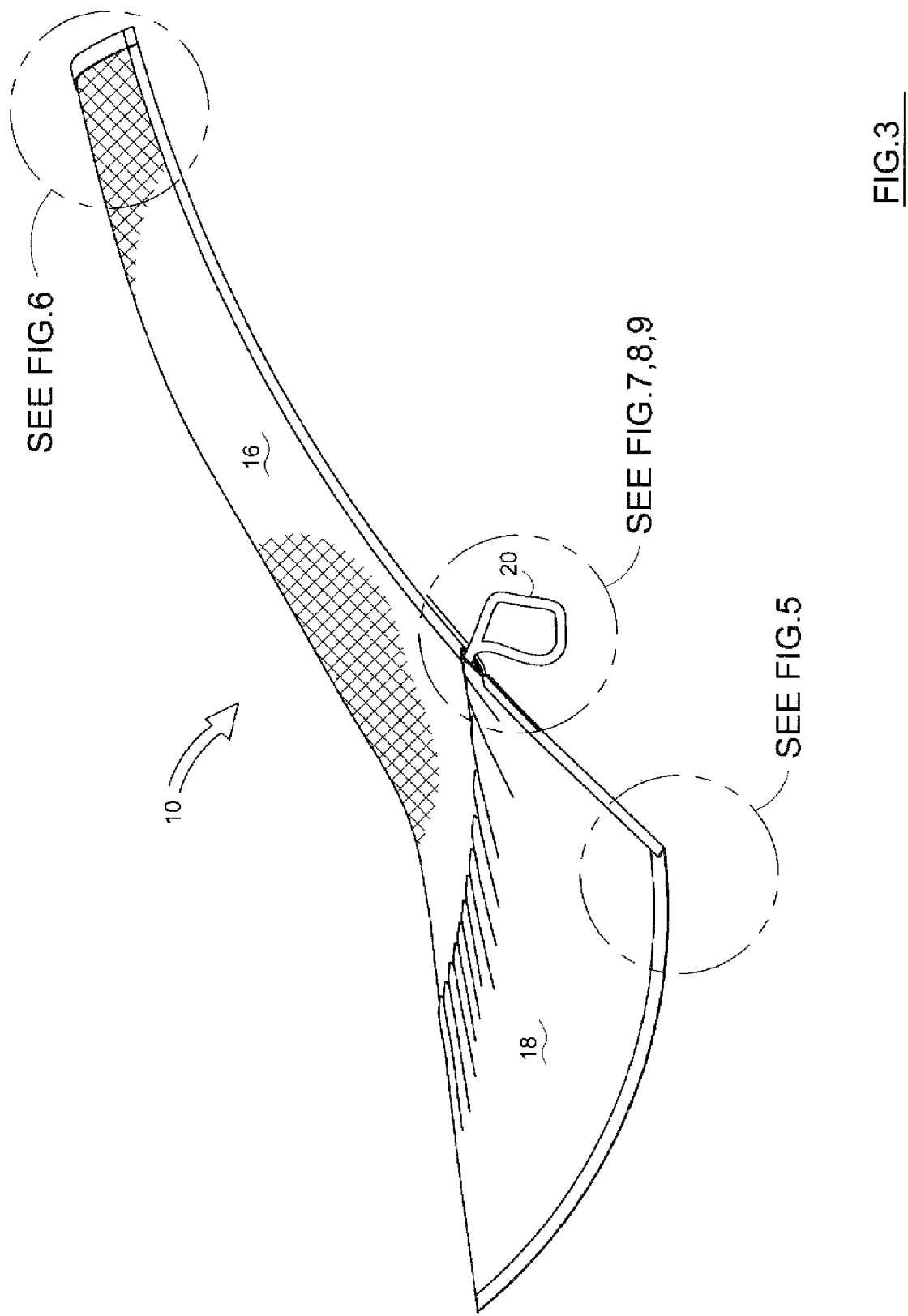
FIG. 3 is a side enlarged view of the windshield gutter guard according to the present invention.

As generally understood, the present invention includes a windshield gutter guard assembly 10 that is constructed and arranged to affix to an automobile 12 and generally is configured to cover the interface between an automobile windshield and the automobile hood where debris typically accumulates. Although the figures demonstrate a standard passenger automobile, the present assembly 10 is contemplated as being customizable for any vehicle. In one embodiment, assembly 10 includes a pair of looped straps 20 affixed to opposite ends of assembly 10 such that looped straps 20 are constructed and arranged to secure assembly 10 in position on automobile 10 by wrapping around existing automobile side-view mirrors 14. Assembly 10 includes, in one embodiment as demonstrated in FIG. 2, windshield cover 16 and gutter cover 18. In one embodiment, each of windshield cover 16 and gutter cover 18 are formed of separate materials that are permanently attached. In another embodiment, windshield cover 16 and gutter cover 18 are formed of a single unitary piece of material.

In one embodiment, assembly 10 includes only gutter cover 18 as the main body of assembly 10.

Figure 4:
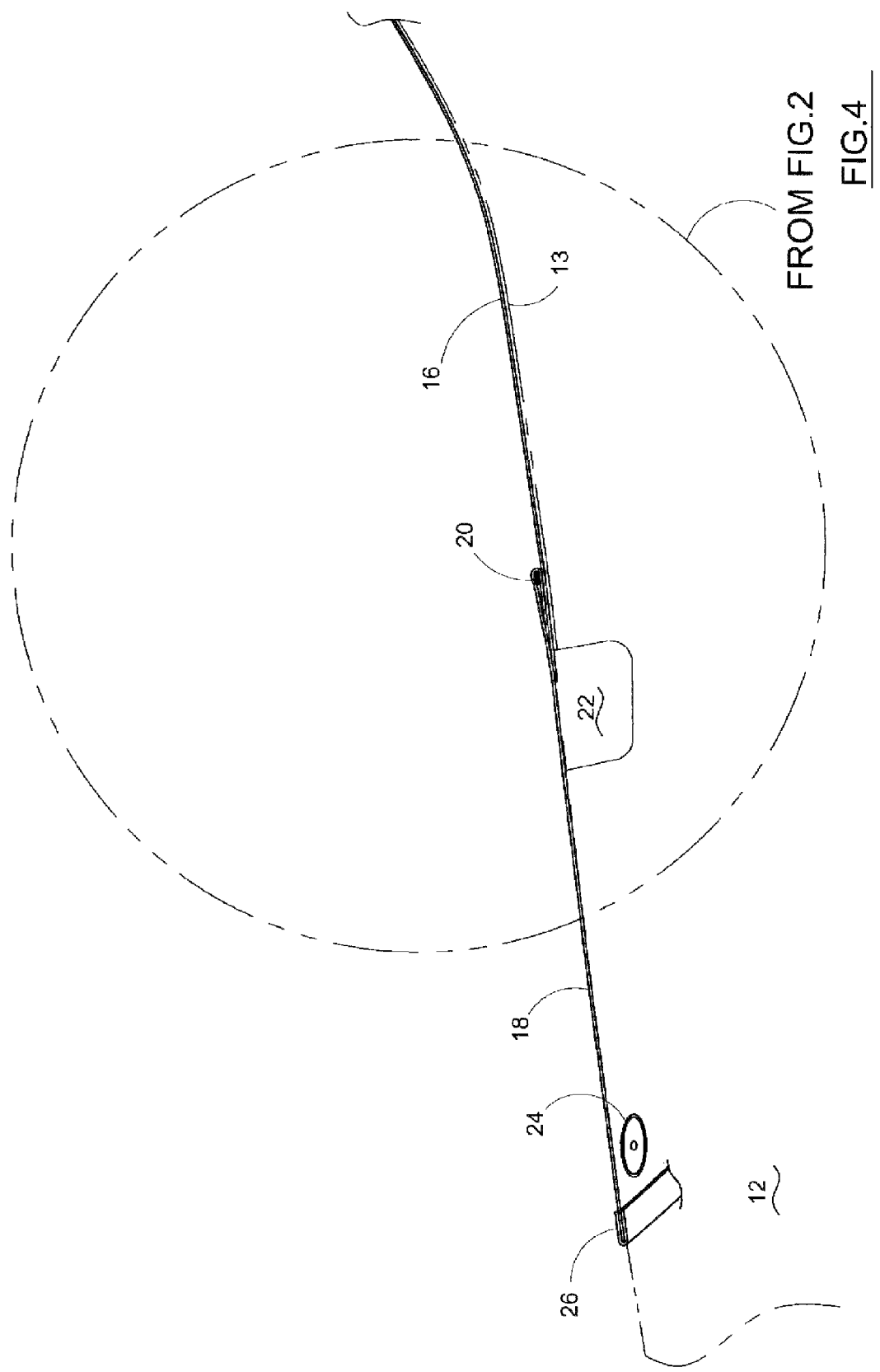
FIG. 4 is a sectional view from FIG. 2.
Figure 5:
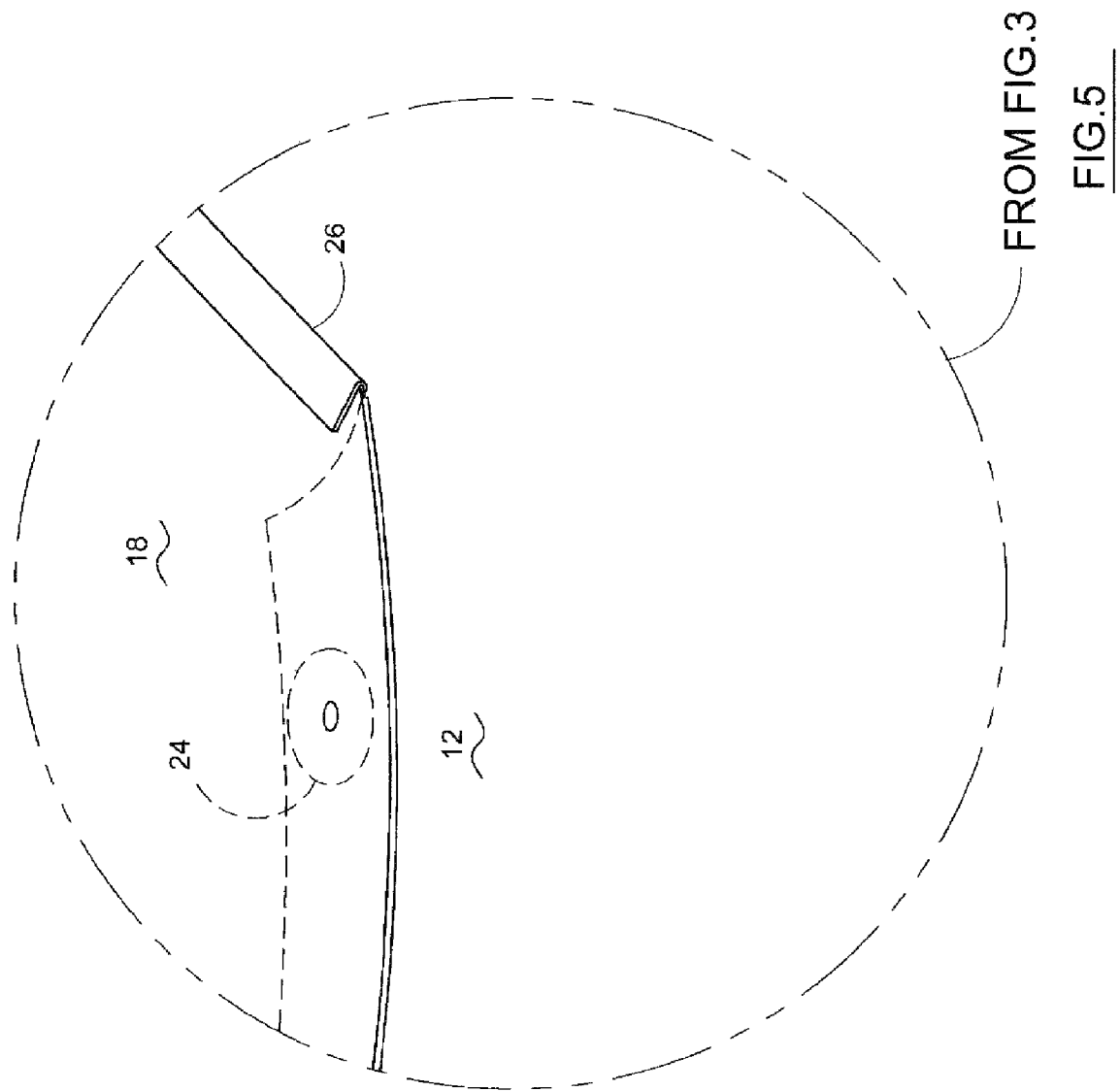
FIG. 5 is a sectional view from FIG. 3.
Figure 6:
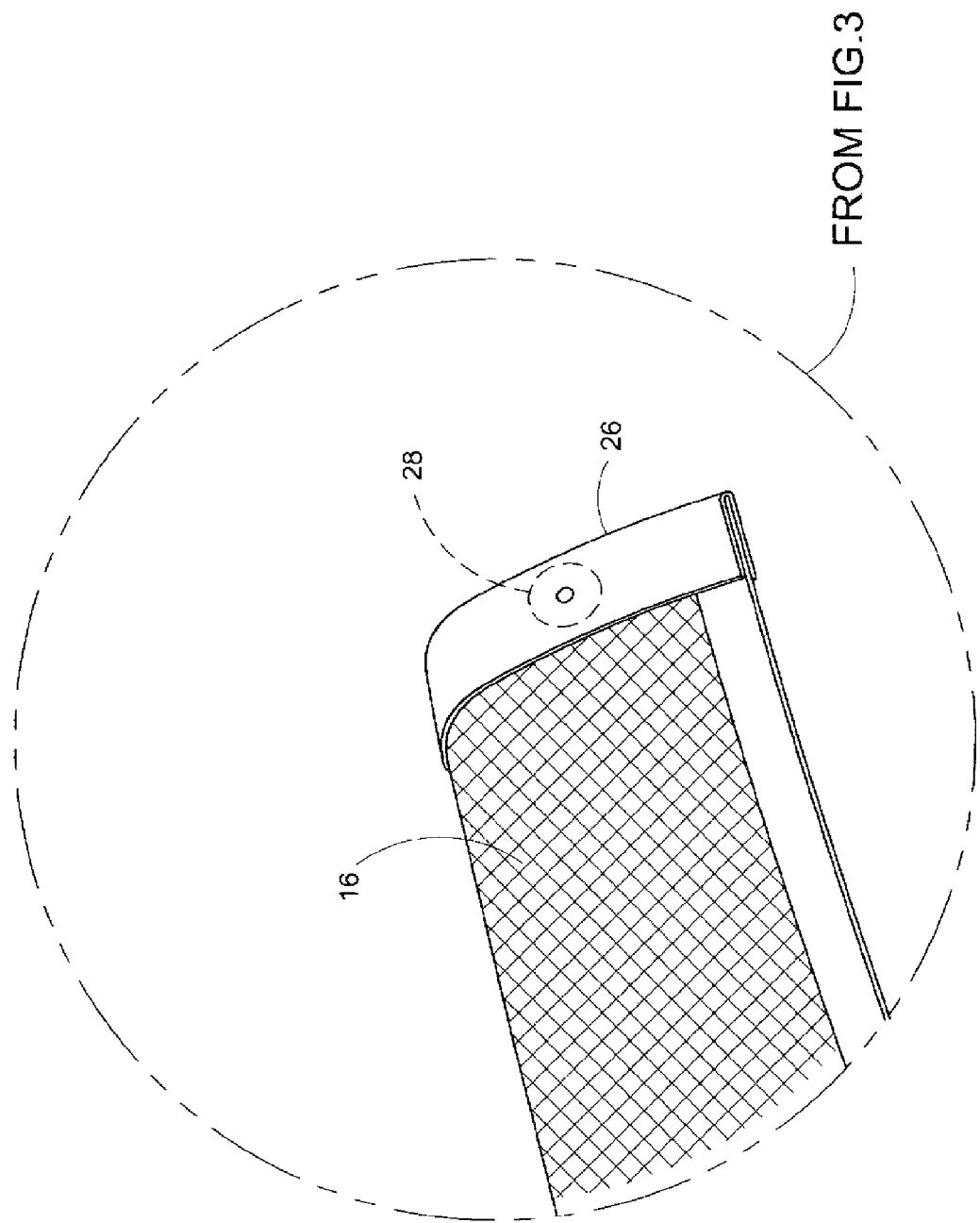
FIG. 6 is a sectional view of the rooftop portion from FIG. 3.

In one embodiment, as demonstrated in FIG. 4, automobile windshield 13 is covered by windshield cover portion 16 and looped strap 20 is positioned on the lower portion of windshield 13 above automobile rain gutter 22. Gutter cover 18 is formed to cover the entirety of automobile rain gutter 22 and is secured onto automobile 12 utilizing one or more lower suction cups 24 positioned on assembly 10 for securing onto the hood of automobile 12. In the embodiment demonstrated in FIG. 4, assembly 10 further includes a fabric edge trim 26 along the lower edge of assembly 10. In one embodiment, demonstrated in FIG. 6, assembly 10 includes fabric edge trim 26 placed along the upper portion of assembly 10 and upper suction cup 28 constructed and arranged to attach to either the front windshield or the roof of an automobile 12.

Figure 1:
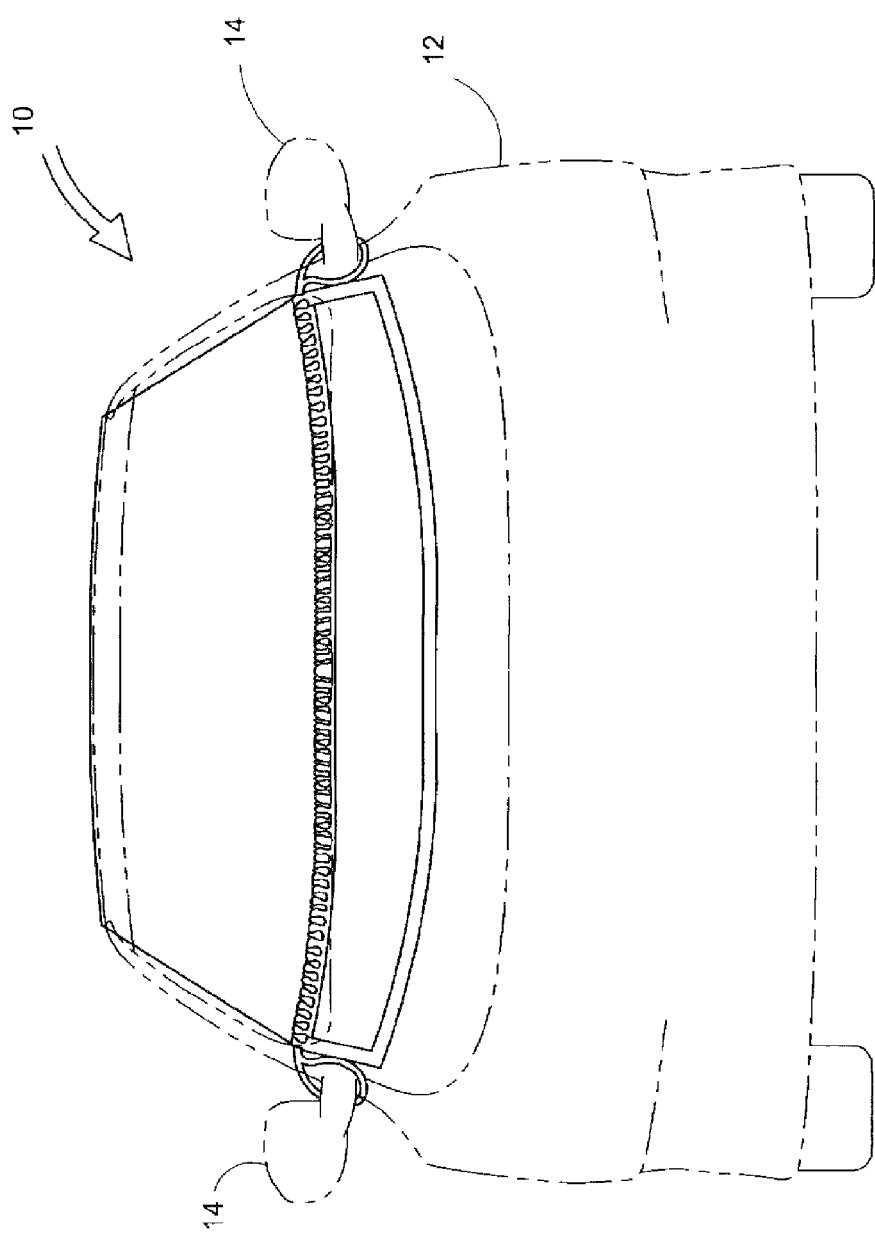
FIG. 1 is a front view of an automobile affixed with the windshield gutter guard according to the present invention.
Figure 7:
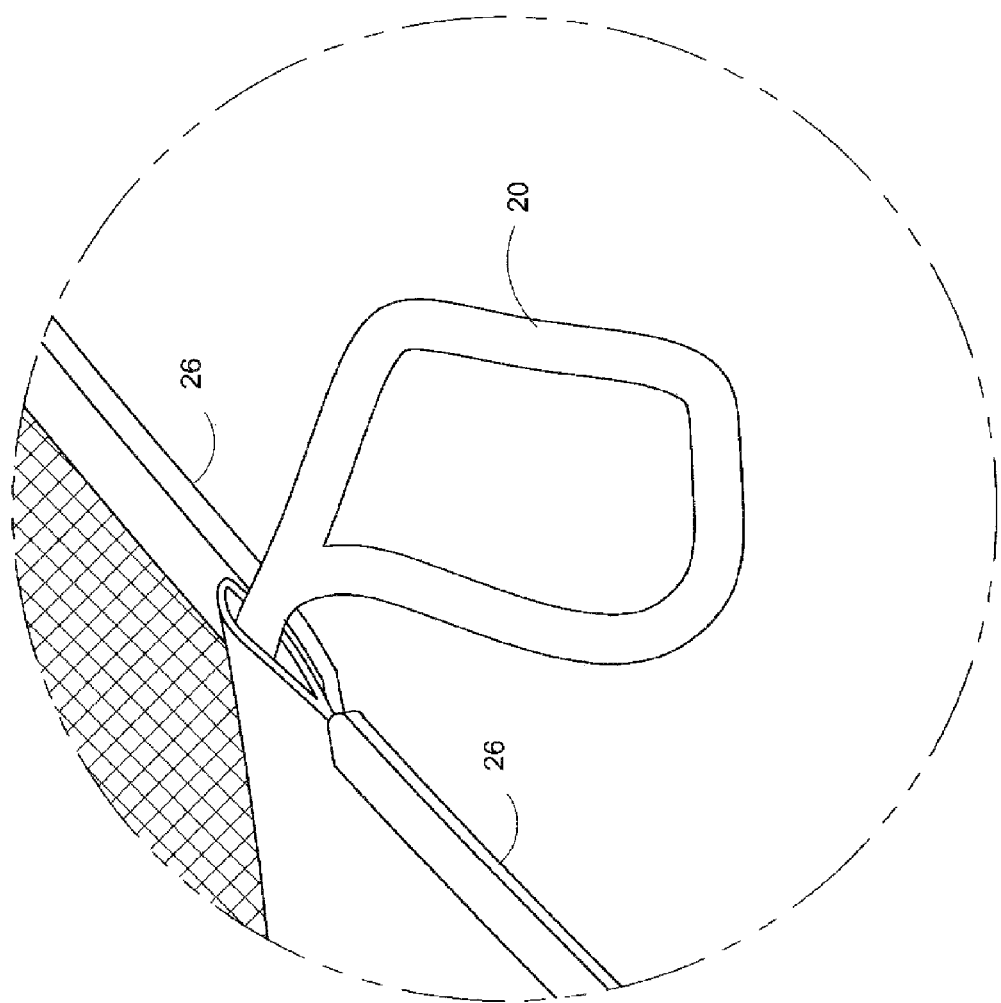
FIG. 7 is a sectional view of the elastic strap portion from FIG. 3.
Figure 8:
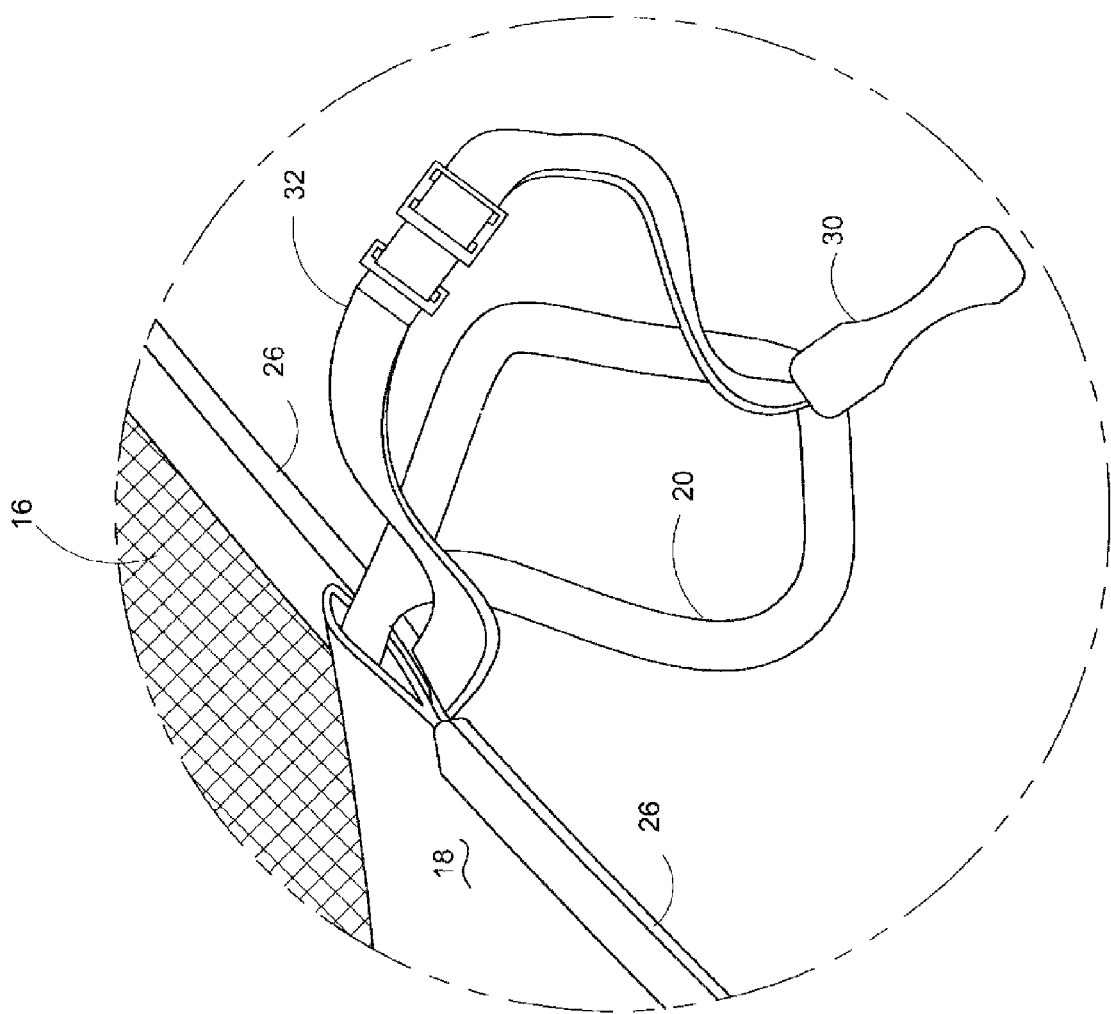
FIG. 8 is a sectional view of one embodiment including a strap handle from FIG. 3.

As demonstrated in FIG. 7, looped strap 20 is constructed and arranged as a complete loop that wraps around each of the opposing automobile side-view mirrors 14, as shown in FIG. 1. In one embodiment, as demonstrated in FIG. 8, each of looped straps 20 further includes strap handle 30 and strap securing belt 32 for tightening assembly 10 into a taut position. In one embodiment, as demonstrated in FIG. 9, strap 20 has a plurality of grommet openings 36 in which a locking mechanism 34 including securing through a grommet 36 is contemplated with the present invention. In this configuration, lock 34 passed through paired opposing grommets 36, as shown, will serve to shorten the amount of open space between in strap 20. Although the figure demonstrates a standard padlock, the present invention is not intended to be limited to such.

As generally understood, the present invention provides an assembly 10 for protecting an automobile rain gutter 22 from accumulation of debris. A user will stretch assembly 10 across the front of the vehicle and secure a first end to one side of the automobile, and the second end to the opposite side of the automobile. Although the figures demonstrate this securing utilizing the looped straps 20 secured to opposing rear-view mirrors 14, the present invention, in one embodiment, is contemplated as including any acceptable securing mechanism that stretches assembly 10 across the front of automobile 12 and covers automobile rain gutter 22.

In one embodiment, the assembly 10 is constructed and arranged of material suitable for protection from snow.

In another embodiment, assembly 10 of the present invention is configured to be placed over the rear window, or rear windshield of the car and protect the interface between the rear windshield and the trunk.

In use, a user will position assembly 10 flat on automobile 12. The user will further position secure assembly 10 such that automobile rain gutter 22 is covered by assembly 10. The user will then secure assembly 10 into a secure position, thus preventing debris from accumulating in the automobile rain gutter 22.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. An assembly for protecting the rain gutter of an automobile, said assembly comprising: a main assembly body, having a first longitudinal edge, nearest to said automobile front end and a second longitudinal edge furthest from said automobile front edge, a first horizontal edge nearest to a driver side of said automobile, and a second horizontal edge, nearest to a passenger side of said automobile; a single band extending through said main assembly body configured on a first end with a first securing means exiting said main assembly body along said first horizontal edge, and a second end with a second securing means exiting said main assembly body along said second horizontal edge, and each securing means including a strap securing belt for tightening said main assembly body into a taut position, whereby said assembly is constructed and arranged to cover the rain gutter of an automobile, wherein said first securing means and second securing means are straps constructed and arranged to attach to existing rear view mirrors of said automobile.

2. The assembly of claim 1 wherein said main assembly body is an automobile rain gutter cover includes one or more suction cups positioned along said first longitudinal edge.

3. The assembly of claim 1 wherein said main assembly body is an automobile rain gutter cover includes one or more suction cups positioned along said first longitudinal edge and one or more suction cups positioned along said second longitudinal edge.

4. The assembly of claim 1 wherein said single belt extending through said main assembly body is an elastic member along said second longitudinal edge.

5. The assembly of claim 1 wherein said first securing means and second securing means are adjustable straps constructed and arranged to attach to existing rear view mirrors of said automobile.

6. The assembly of claim 1 further comprising a windshield cover having a lower longitudinal edge and an upper longitudinal edge, said windshield cover is attached to said main body, wherein said lower longitudinal edge of said windshield cover is attached to said second longitudinal edge of said main body.

7. The assembly of claim 6 wherein said windshield cover is permanently attached to said main body.

8. The assembly of claim 6 wherein said windshield cover is removably attached to said main body.

9. The assembly of claim 6, wherein said windshield cover includes one or more suction cups along said upper longitudinal edge.

* * * * *